(12) United States Patent
Hatanaka

(10) Patent No.: US 11,543,957 B2
(45) Date of Patent: Jan. 3, 2023

(54) TREE-INFORMATION-PROVIDING DEVICE AND PROGRAM PRODUCT FOR TREE INFORMATION PROVISION

(71) Applicant: FORUM ENGINEERING INC., Tokyo (JP)

(72) Inventor: Aki Hatanaka, Tokyo (JP)

(73) Assignee: FORUM ENGINEERING INC., Tokyo (JP)

( * ) Notice: Subject to any disclaimer, the term of this patent is extended or adjusted under 35 U.S.C. 154(b) by 0 days.

(21) Appl. No.: 17/422,816

(22) PCT Filed: Feb. 8, 2019

(86) PCT No.: PCT/JP2019/004748
§ 371 (c)(1),
(2) Date: Jul. 14, 2021

(87) PCT Pub. No.: WO2020/161918
PCT Pub. Date: Aug. 13, 2020

(65) Prior Publication Data
US 2022/0066607 A1 Mar. 3, 2022

(51) Int. Cl.
*G06F 3/0488* (2022.01)
*G06F 3/0482* (2013.01)

(52) U.S. Cl.
CPC .......... *G06F 3/0488* (2013.01); *G06F 3/0482* (2013.01)

(58) Field of Classification Search
CPC ....... G06F 3/0482; G06F 3/0488; G06F 16/26
See application file for complete search history.

(56) References Cited

U.S. PATENT DOCUMENTS

| | | | |
|---|---|---|---|
| 6,380,947 B1 * | 4/2002 | Stead | G06F 3/0485 715/854 |
| 7,392,488 B2 * | 6/2008 | Card | G06F 16/954 715/853 |
| 8,458,169 B2 * | 6/2013 | Griggs | G06F 16/90328 707/722 |

(Continued)

FOREIGN PATENT DOCUMENTS

JP H04-255023 A 9/1992

OTHER PUBLICATIONS

International Search Report and Written Opinion of the International Searching Authority issued by the Japan Patent Office for corresponding International Patent Application No. PCT/JP2019/004748, dated Apr. 2, 2019, with a partial English translation.

*Primary Examiner* — Seth A Silverman
(74) *Attorney, Agent, or Firm* — Myers Wolin, LLC

(57) ABSTRACT

A controller is configured to accept a user input from an input interface, access a memory storing tree information that includes pieces of information about a plurality of hierarchized elements, and generate a screen command related to a display screen of a display. The controller causes elements included in the tree information to be displayed on the display. When an element located in the center in the width direction of the display receives an expanding operation, child elements are expanded one layer below the element. When a parent element of child elements goes beyond the center in the width direction, in response to the width direction slide operation, the child elements subordinate to the element are hidden on the display.

18 Claims, 15 Drawing Sheets

(56) References Cited

U.S. PATENT DOCUMENTS

| | | | |
|---|---|---|---|
| 8,677,279 B2* | 3/2014 | Gan | G06F 16/904 |
| | | | 715/764 |
| 9,519,693 B2* | 12/2016 | Audet | G06F 3/0482 |
| 10,445,805 B2* | 10/2019 | Hodge | G06F 3/04847 |
| 2015/0242079 A1* | 8/2015 | Vernia | H04L 41/22 |
| | | | 715/855 |

* cited by examiner

TREE-INFORMATION-PROVIDING DEVICE AND PROGRAM PRODUCT FOR TREE INFORMATION PROVISION

CROSS-REFERENCE TO RELATED APPLICATION

This application is a national stage application of International Application No. PCT/JP2019/004748, filed on Feb. 8, 2019 and designated the U.S. The contents of which are herein incorporated by reference.

TECHNICAL FIELD

The present disclosure relates to a tree-information-providing device and a program product for tree information provision, particularly to a tree-information-providing device and a program product for tree information provision for providing tree information including pieces of information about many hierarchized elements on a display.

BACKGROUND ART

In Patent Document 1 below, a device for displaying pieces of multi-layered screen information systemized in a tree shape (hereinafter referred to as "tree information") is disclosed. Since many pieces of information are included in the tree information, it may be difficult to display all the tree information in one screen.

In the conventional device described above, a title name and a number are given to each of the pieces of screen information hierarchized in the tree information. Further, in this device, assistance screen information is prepared in which sets of the title name and the number are hierarchically displayed similarly to relationships in the tree information.

In the above conventional device, when information is provided for a user, the assistance screen information can be displayed on a display first. By specifying a desired title or number from among the titles or numbers included in the display, the user who receives provision of the display can call screen information corresponding to the title or the number. Thus, according to the above conventional device, the user can efficiently call desired information from the tree information that may have a huge amount of information.

RELATED ART DOCUMENTS

Patent Document

[Patent Document 1] JP 1996(H4)-255023 A

Problem to be Solved by the Disclosure

In the above conventional device, however, a user can select display information only for each screen to which a title is assigned. Therefore, if the user cannot find desired information in a screen, the user has to return to the assistance screen again and select a new screen. Further, a displayed screen may include a great deal of information that is useless to the user. From these points, the above conventional device is not necessarily excellent in convenience for the user who wants to access the tree information.

The present disclosure has been made to solve the problems as described above, and an object is to provide a tree-information-providing device for causing information desired by a user, among pieces of information included in tree information which are pieces of information about many hierarchized elements, to be efficiently displayed on a display.

Further, a second object of the present disclosure is to provide a tree information provision program product that realizes functions of the tree-information-providing device described above by being executed by a control unit.

Means for Solving the Problem

To achieve the above mentioned purpose, a first aspect of the present disclosure is a tree-information-providing device comprising a control unit configured to accept a user input from an input interface, access a memory that stores tree information that includes pieces of information about many hierarchized elements, and generate a screen command related to a display screen of a display, wherein
the control unit is configured to execute:
a process for causing the elements included in the tree information to be displayed on the display, in response to a user input for display of the elements;
a process for accepting a user input for an expanding operation for any of the elements displayed on the display;
a process for, in response to the expanding operation, displaying the element targeted by the expanding operation in a vertical reference region extending in a longitudinal direction, the vertical reference region being defined at a particular position in a width direction of the display;
a process for expanding child elements in a width direction region extending in the width direction one layer below the element on the display, if the element displayed in the vertical reference region has received the expanding operation, and one or more child elements are subordinate to the element on a layer lower than the element in the tree information;
a process for accepting a user input for a width direction slide operation;
a process for causing all the elements included in the width direction region, which are targeted by the width direction slide operation, to laterally slide together in the width direction, in response to the width direction slide operation; and
a process for causing child elements subordinate to an element that has gone beyond the vertical reference region in the width direction to be hidden on the display.

The control unit may be configured to further execute a process for maintaining a size of each of the elements displayed on the display at a fixed size and displaying elements within a range that fits in a display area of the display, among all the elements requested to be displayed, on the display.

The control unit may be configured to further execute:
a process for accepting a user input for a longitudinal direction slide operation; and
a process for causing all the elements requested to be displayed on the display to longitudinally slide together in the longitudinal direction, in response to the longitudinal direction slide operation.

The control unit may be configured to further execute a process for causing all the elements requested to be displayed on the display to longitudinally slide together in the longitudinal direction so that the width direction region fits in the longitudinal direction, if the width direction region where the child elements newly expanded in response to the expanding operation are to be displayed goes beyond the display area of the display in the longitudinal direction.

The control unit may be configured to further execute a process for, in the case of displaying on the display an element having the child elements on a lower layer, the child elements being unexpanded, attaching a expandable indication indicating that expanding is possible to the element.

The control unit is configured to further execute a process for changing the expandable indication to a expanded indication, when accepting the user input for the expanding operation for the element attached with the expandable indication.

The expandable indication may be a expandable mark added to a display of the element; and the control unit may be configured to further execute:

a process for accepting a user input targeting the expandable mark as the expanding operation; and a process for accepting a user input targeting the display of the element as a designation operation of the element.

The elements included in the tree information may be about hierarchized technical skill items; and the control unit may be configured to further execute:

a process for accepting a user input of a learning level for the element targeted by the designation operation, when accepting the designation operation; and a process for registering the learning level in association with the element.

The control unit may be configured to further execute a process for displaying a line connecting each of the child element and an element to which the child element is subordinate on the display together, when displaying the child elements on the display.

A second aspect of the present disclosure is a program product for tree information provision that a control unit is caused to execute, the control unit being configured to accept a user input from an input interface, access a memory storing tree information that includes pieces of information about a plurality of hierarchized elements, and generate a screen command related to a display screen of a display, the program product for tree information provision comprising a program for causing the control unit to realize:

a process for causing the elements included in the tree information to be displayed on the display, in response to a user input for display of the elements;

a process for accepting a user input for a expanding operation for any of the elements displayed on the display;

a process for, in response to the expanding operation, displaying the element targeted by the expanding operation in a vertical reference region extending in a longitudinal direction, the vertical reference region being defined at a particular position in a width direction of the display;

a process for, if the element displayed in the vertical reference region has received the expanding operation, and one or more child elements are subordinate to the element on a layer lower than the element in the tree information, expanding and displaying the child elements in a width direction region extending in the width direction one layer below the element on the display;

a process for accepting a user input for a width direction slide operation;

a process for causing all the elements included in the width direction region, which are targeted by the width direction slide operation, to laterally slide together in the width direction, in response to the width direction slide operation; and a process for causing child elements subordinate to an element that has gone beyond the vertical reference region in the width direction to be hidden on the display.

The program product may further comprises a program for causing the control unit to realize a process for maintaining a size of each of the elements displayed on the display at a fixed size and displaying elements within a range that fits in a display area of the display, among all the elements requested to be displayed, on the display.

The program product may further comprises a program for causing the control unit to realize:

a process for accepting a user input for a longitudinal direction slide operation; and a process for causing all the elements requested to be displayed on the display to longitudinally slide together in the longitudinal direction, in response to the longitudinal direction slide operation.

The program product may further comprises a program for causing the control unit to realize a process for, if the width direction region where the child elements newly expanded in response to the expanding operation are to be displayed goes beyond the display area of the display in the longitudinal direction, causing all the elements requested to be displayed on the display to longitudinally slide together in the longitudinal direction so that the width direction region fits in the longitudinal direction.

The program product may further comprising a program for causing the control unit to realize a process for, in the case of displaying on the display an element having the child elements on a lower layer, the child elements being unexpanded, attaching a expandable indication indicating that expanding is possible to the element.

The program product may further comprising a program for causing the control unit to realize a process for changing the expandable indication to a expanded indication, when accepting the user input for the expanding operation for the element attached with the expandable indication.

The expandable indication may be a expandable mark added to a display of the element; and the program product may further comprises a program for causing the control unit to execute:

a process for causing a user input targeting the expandable mark to be accepted as the expanding operation; and a process for causing a user input targeting the display of the element to be accepted as a designation operation of the element.

The elements included in the tree information may be about hierarchized technical skill items; and the program product may further comprises a program for causing the control unit to realize:

a process for causing a user input of a learning level to be accepted for the element targeted by the designation operation, after accepting the designation operation; and a process for registering the learning level in association with the element.

The program product may further comprises a program for causing the control unit to realize a process for displaying a line connecting each of the child element and an element to which the child element is subordinate on the display together, when displaying the child elements on the display.

Advantages of the Aspect of the Disclosure

According to the first and second aspect of the disclosures, an element that has received an expanding operation by a user is displayed on a vertical reference region on a display. Further, child elements subordinate to the element are displayed in a width direction region one layer below the element. According to such display, elements desired by the user among elements included in tree information can be provided on the display in a state in which a hierarchical relationship is clarified. Further, according to the present disclosure, when the element to which the child elements displayed on the display are subordinate goes beyond the vertical reference region by a lateral slide operation, display of the child elements disappears from the display. Then, if an expanding operation is or has been performed for an element that newly fits in the vertical reference region, child elements subordinate to the new element are displayed on the display. According to such display, elements that the user pays attention to can be preferentially displayed on the display, and it is possible to always provide information without waste.

Since the size of each element is maintained, and elements within a range that fits in the display area of the display are displayed, the user can visually confirm a group of elements which the user pays attention to without performing a display zooming operation. Further, elements that are beyond the display area in the width direction can be appropriately fit in the display area by a width direction slide operation.

Since elements are slid in a longitudinal direction by a longitudinal slide operation, the user can appropriately fit elements that are beyond the display area in the longitudinal direction in the display area without performing a display zooming operation.

The width direction region located one layer below an element located near the lower end of the display area of the display may go beyond the display area in the longitudinal direction. Since all the elements are longitudinally slid so that the width direction region fits in the display area when a expanding operation is performed for the element, the user can visually confirm newly expanded child elements without performing a longitudinal slide operation.

Since an expandable indication is attached to an element that has unexpanded child elements, the user can recognize whether each individual element is expandable or not without trying a expanding operation.

According to the present disclosure, when an element for which a expanding operation has been performed goes beyond the vertical reference region, child elements subordinate to the element enter a hidden state. Since an expandable indication of an element is changed to an expanded indication by an expanding operation having been performed for the element, the user can recognize whether an element displayed at a position beyond the vertical reference region is an element for which a expanding operation has already been performed or not.

Since the expandable indication is a expanding mark attached to the display of an element, the user can recognize a target portion of a designation operation for designating the element itself and a target portion of a expanding operation, clearly distinguishing between both.

Since the tree information is about technical skills, and it is possible to register a learning level for an element that has received a designation operation, the user can easily register all technical skills the user has.

Since child elements and an element to which the child elements are subordinate are displayed together with lines connecting the element and the child elements, the user can intuitively recognize how many child elements are subordinate to the element, and where a child element the user is visually confirming is located among all the child elements.

DESCRIPTION OF EMBODIMENTS

First Embodiment

Configuration of First Embodiment

Figure 1:
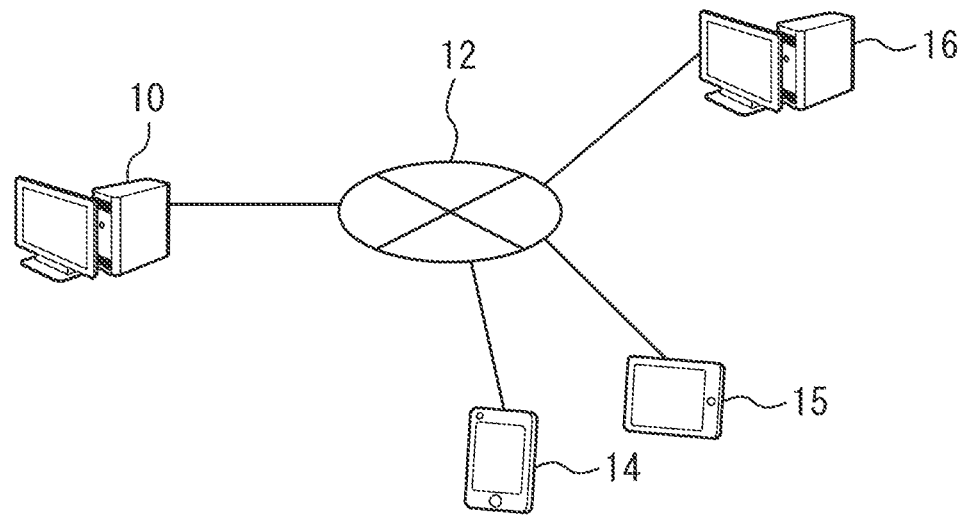
FIG. 1 is a diagram for illustrating an overview of a network that includes a tree-information-providing device of a first embodiment of the present disclosure.

FIG. 1 is a diagram for illustrating an overview of a network that includes a tree-information-providing device of a first embodiment of the present disclosure. The tree-information-providing device of the present embodiment is provided with a management server 10. The management server 10 is connected to a plurality of terminals 14, 15, 16 and the like via a network. The terminals 14, 15 and 16 indicate a smartphone, a tablet and a personal computer, respectively. Note that, for the present embodiment, any device that is provided with capabilities of display, input and calculation, such as a gaming machine and a large monitor screen or the likes can be used as a terminal without being limited to the above terminals.

The tree-information-providing device of the present embodiment is configured to provide tree information that includes pieces of information about many hierarchized elements for the terminal 14, 15 or 16. In the present embodiment, a description will be made especially on a case where the tree information is provided for the terminal 14, 15 or 16 under the following situation.

1. The user is a technical job seeker.
2. The user wants to register his technical skills with the management server 10 as information to recruiters through the terminal 14, 15 or 16.
3. The management server 10 provides tree information about technical skills for the terminal 14, 15 or 16 in order to facilitate the above registration.
4. The user selects elements corresponding to his skills from among many elements included in the tree information, and registers the elements together with his learning levels.

Figure 2:
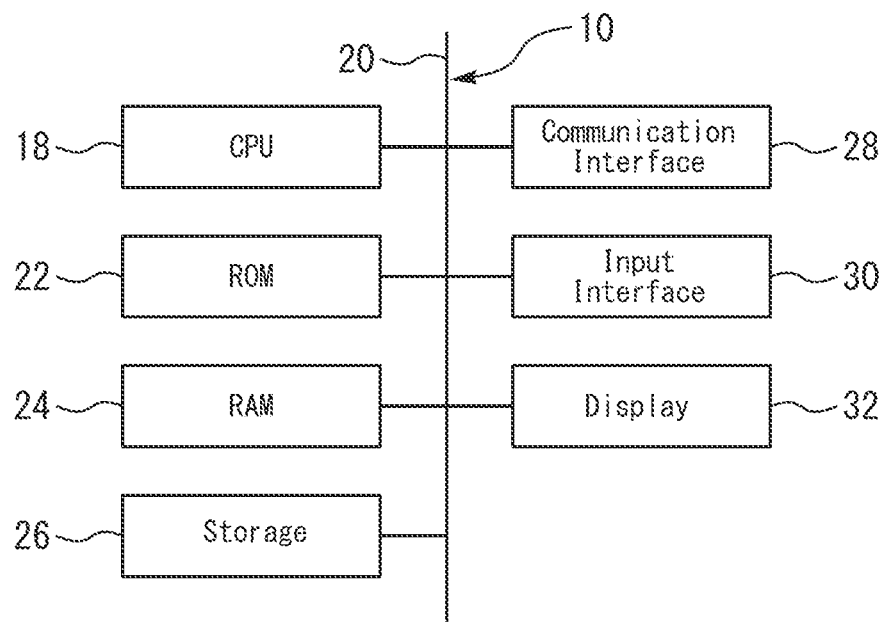
FIG. 2 is a diagram showing a hardware configuration of the management server shown in FIG. 1.

FIG. 2 shows a hardware configuration of the management server 10. The management server 10 is configured with a general computer system and is provided with a central processor (CPU) 18. Memory mechanisms such as a ROM 22, a RAM 24 and a storage 26 are connected to the CPU 18 via a communication bus 20. Furthermore, a communication interface 28, an input interface 30 and a display 32 are connected to the communication bus 20.

In the ROM 22 of the management server 10, a program executed by the CPU 18 is stored. In the storage 26 of the management server 10, the tree information about technical skills is stored. In the present embodiment, by the program stored in the ROM 22 being executed by the CPU 18, a screen command based on the tree information stored in the storage 26 is provided for the terminal 14, 15 or 16.

Each of the terminals 14, 15 and 16 has a hardware configuration such as shown in FIG. 2 similarly to the management server 10. Hereinafter, hardware elements of the terminal 14, 15 or 16 will be also referred to the CPU 18, the input interface 30, the display 32 and the like using the reference numerals shown in FIG. 2.

Figure 3:
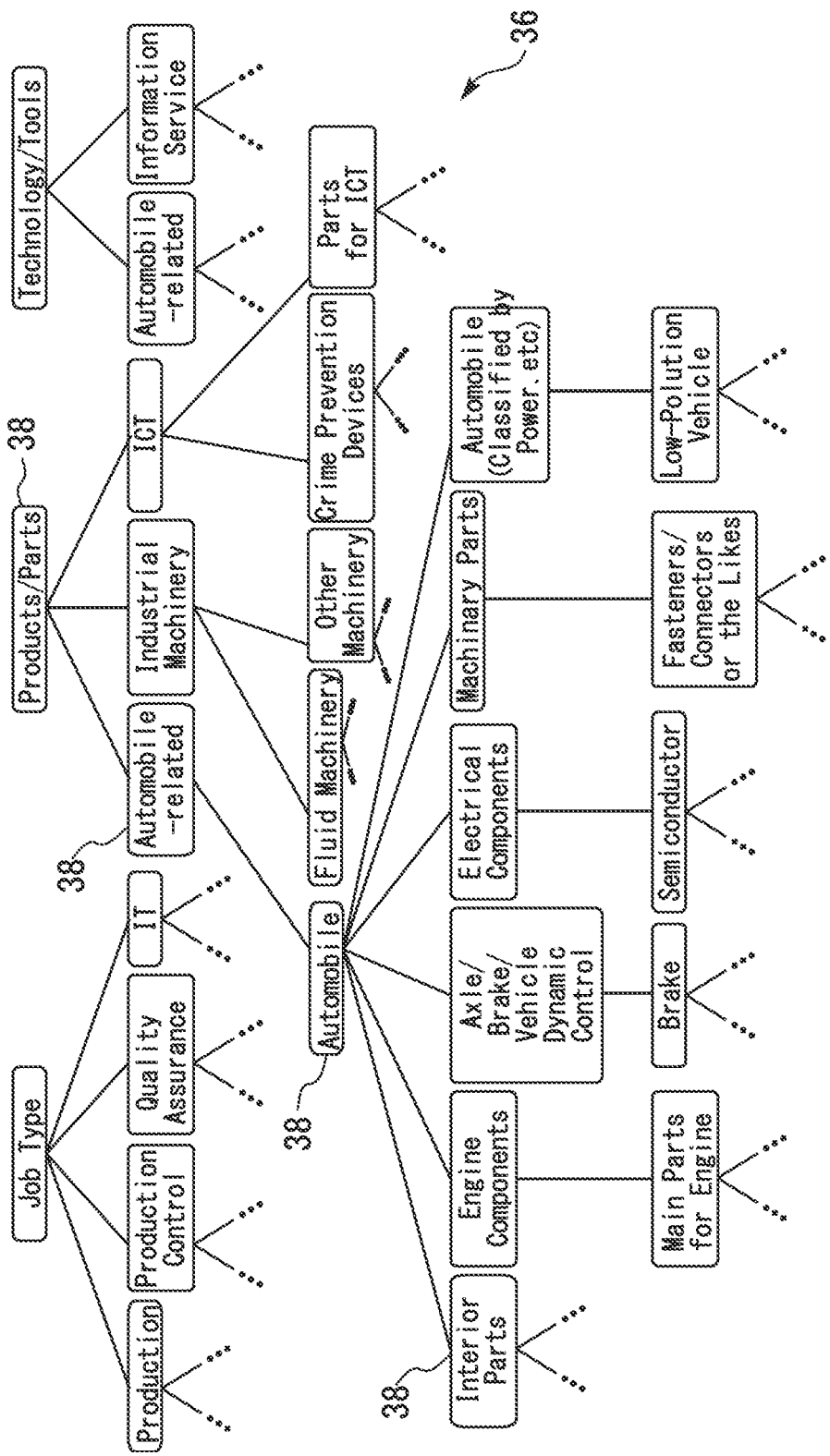
FIG. 3 is a diagram showing an example of tree information including hierarchized information of a lot of elements regarding technical skills.

FIG. 3 shows an example of tree information 36 stored in the storage 26 of the management server 10. The tree information 36 includes pieces of information about many hierarchized elements 38. In the example shown in FIG. 3, on a layer below a "Products/Parts" element 38, elements 38 such as "Automobile Related", "Industrial Machinery" and "Information Communication" are subordinate. Further, on a layer below the "Information Communication" element 38, elements 38 such as "Crime Prevention/Disaster Prevention" and "Parts for Information Communication Device" are subordinate.

In the present embodiment, the tree information 36 includes the many elements 38. Therefore, if it is attempted to display each individual element 38 in a size suitable for visual confirmation, it is not possible to include all the tree information 36 in the display 32 of the terminal 14, 15 or 16. For a user who wants to register technical skills, elements related to his technical skills are generally only a part of the elements 38 included in the tree information 36. Therefore, if all the elements 38 are displayed on the display 32, many elements that are useless to the user are displayed, and the user feels annoyance.

Therefore, in the present embodiment, in order to cause elements 38 related to each user to be preferentially displayed on the display 32 of the terminal 14, 15 or 16, the management server 10 and the terminal 14, 15 or 16 are caused to execute a process described below. Note that the process described below may be executed by the CPU 18 of the management server 10 alone, may be executed by the CPU 18 of the terminal 14, 15 or 16 alone or may be executed by the CPUs 18 of both of the management server 10 and the terminal 14, 15 or 16 in mutual cooperation.

[Characteristics about Display of Elements]

Hereinafter, a description will be made on content of the process executed to cause elements 38 useful to a user to be preferentially displayed on the display 32 with reference to FIGS. 4 to 10, with a case of the terminal 14 in a form of a smartphone as an example.

Figure 4:
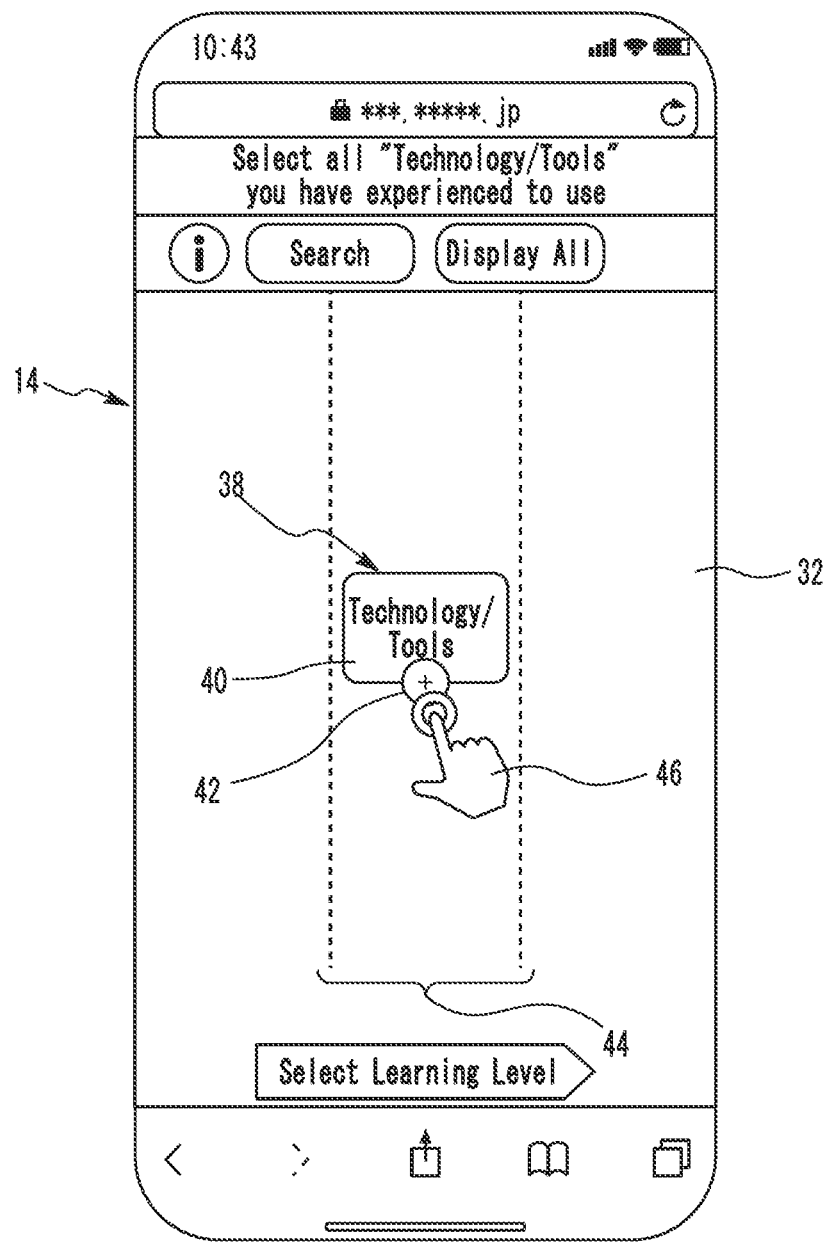
FIG. 4 shows a state in which one element is displayed on the display of the terminal shown in FIG. 1.

FIG. 4 shows a state in which one element 38 is displayed on the display 32 of the terminal 14. The screen shown in FIG. 4 is generated by the user of the terminal 14 accessing the management server 10, desiring to register his technical skills. When receiving such access, the management server 10 reads out a element desired by the user from the tree information in the storage 26 and transmits a screen command corresponding to the element to the terminal 14. The terminal 14 displays the screen shown in FIG. 4 on the display 32 according to the screen command.

On the screen shown in FIG. 4, a "Technology/Tools" element 38 located on the highest layer in the technical tree is shown. In more detail, this element 38 is indicated by an element mark 40 and a expandable mark 42. The element mark 40 is a mark which indicates an outer frame of the element 38. The expandable mark 42 is a mark which indicates that one or more child elements that have not been expanded yet are subordinate on a layer below the element 38. In the present embodiment, a mark formed by "+" surrounded by a circle is used as the expandable mark 42.

Note that, in the present embodiment, an element 38 to which no child element is subordinate on a lower layer is indicated only by the element mark 40 without being accompanied by the expandable mark 42. Therefore, based on whether each individual element 38 is accompanied by the expandable mark 42 or not, the user of the terminal 14 can identify whether the element 38 is further provided with child elements on a lower layer or the element 38 is an element on the lowest layer at the end.

On the display 32 of the terminal 14, a vertical reference region 44 as shown in FIG. 4 is defined. The vertical reference region 44 is set to extend in the longitudinal direction of the display 32, at a particular position in the width direction of the display 32. In the present embodiment, a central area in the width direction of the display 32 is defined as the vertical reference region 44 as shown by two broken lines in FIG. 4. Note that the two broken lines shown in FIG. 4 are imaginary lines that are actually not displayed.

When registration of the technical skills is requested by the user, the management server 10 causes an element 38 on the highest layer belonging to a region desired by the user, among the elements included in the tree information, to be displayed on the display 32 of the terminal 14 such that the element 38 on the highest layer fits in the vertical reference region 44. When the element 38 is displayed on the display 32 being accompanied by the expandable mark 42, the user can understand that one or more child elements are subordinate to the element 38.

The display 32 of the terminal 14 is configured with a touch panel and also serves as the input interface 30. The user can give a user input intended to be a desired operation to the terminal 14 by a tap or the like on the display 32. A hand shape mark 46 shown in FIG. 4 is an imaginary mark that is actually not displayed, and it indicates a user input for a expanding operation of tapping the expandable mark 42 of "Technology/Tools".

Figure 5:
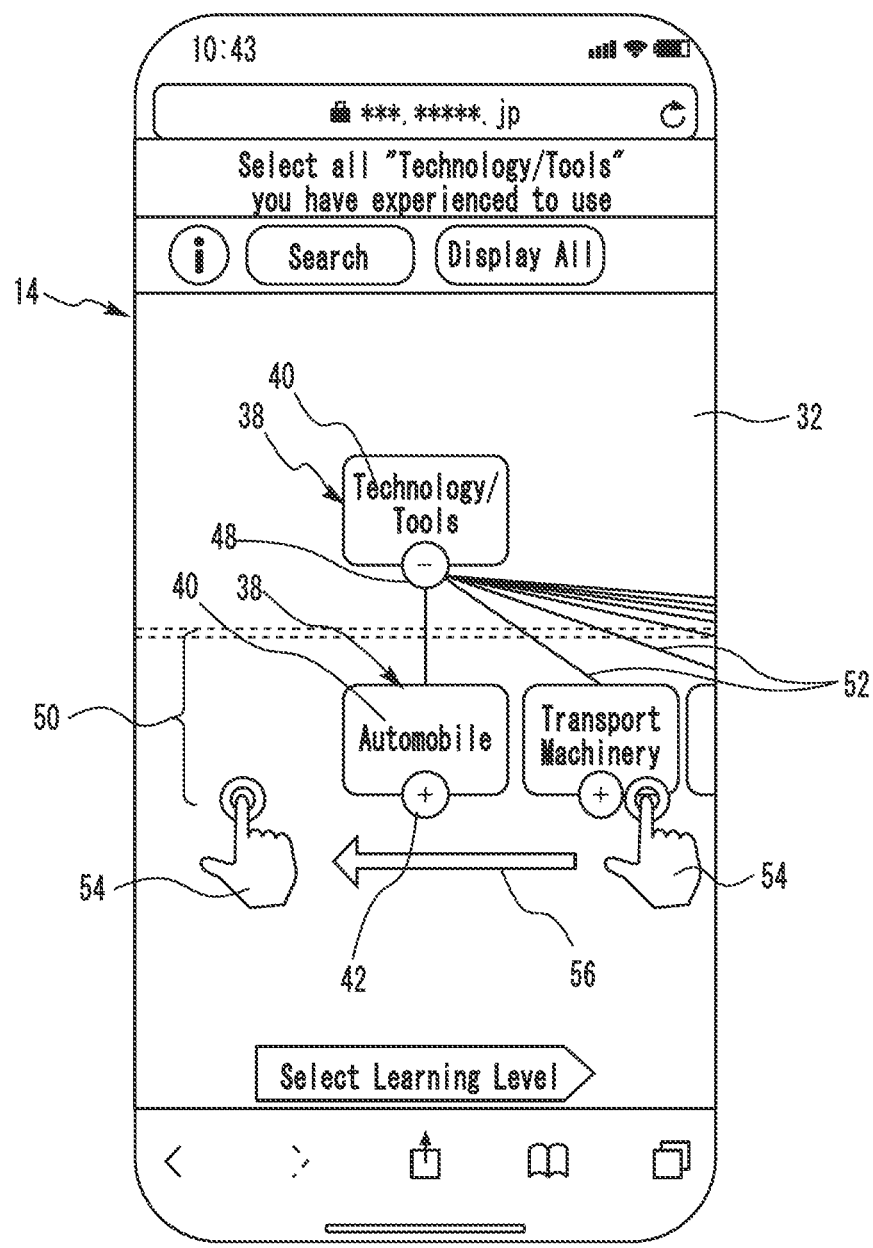
FIG. 5 shows a state in which child elements are expanded as a result of an execution of a expanding operation on the element shown in FIG. 4.

FIG. 5 shows a state in which child elements subordinate to the "Technology/Tools" element 38 are expanded on a layer below the element 38, as a result of the above expanding operation. When the child elements subordinate to the element 38 are expanded, the expandable mark 42 attached to the element 38 changes to a expanded mark 48. In the present embodiment, a mark formed by "–" surrounded by a circle is used as the expanded mark 48. Further, when there are a plurality of elements 38 that are expanded as the child elements, they are expanded in a width direction region 50 defined one layer below the element 38 to which they are subordinate, being arranged side by side in the width direction.

In the present embodiment, elements 38 displayed on the display 32 of the terminal 14 are given a size suitable for visual confirmation by the user, irrespective of the number of expanded elements. Therefore, when the number of child elements expanded in the one width direction region 50 is large, such a situation occurs that all of them cannot be fit in the display 32 in the width direction. In this case, the expanded child elements within a range that fits in the width of the display 32 are displayed, but those beyond the width of the display 32 are not displayed.

As shown in FIG. 5, between the parent element 38 and the child elements 38 subordinate to the parent element 38, lines 52 connecting the parent element 38 and the child elements are shown. lines 52 are displayed for each of all the expanded elements 38 including child elements 38 that are beyond the width of the display 32 and are not displayed. By the lines 52 being displayed as described above, the user can recognize how many child elements are subordinate to the parent element 38, furthermore, the user can also recognize which elements 38 of the child elements is displayed on the display 32.

Two hand shape marks 54 and an arrow 56 between the two hand shape marks 54 shown in FIG. 5 indicate a user input for a width direction slide operation. These are imaginary similarly to the hand shape mark 46 shown in FIG. 4 and are not actually displayed on the display 32. The width direction slide operation is being performed, with the one width direction region 50 as a target. When this operation is performed, all the expanded elements 38 included in the width direction region 50, which is the operation target, move together in the width direction.

Figure 6:
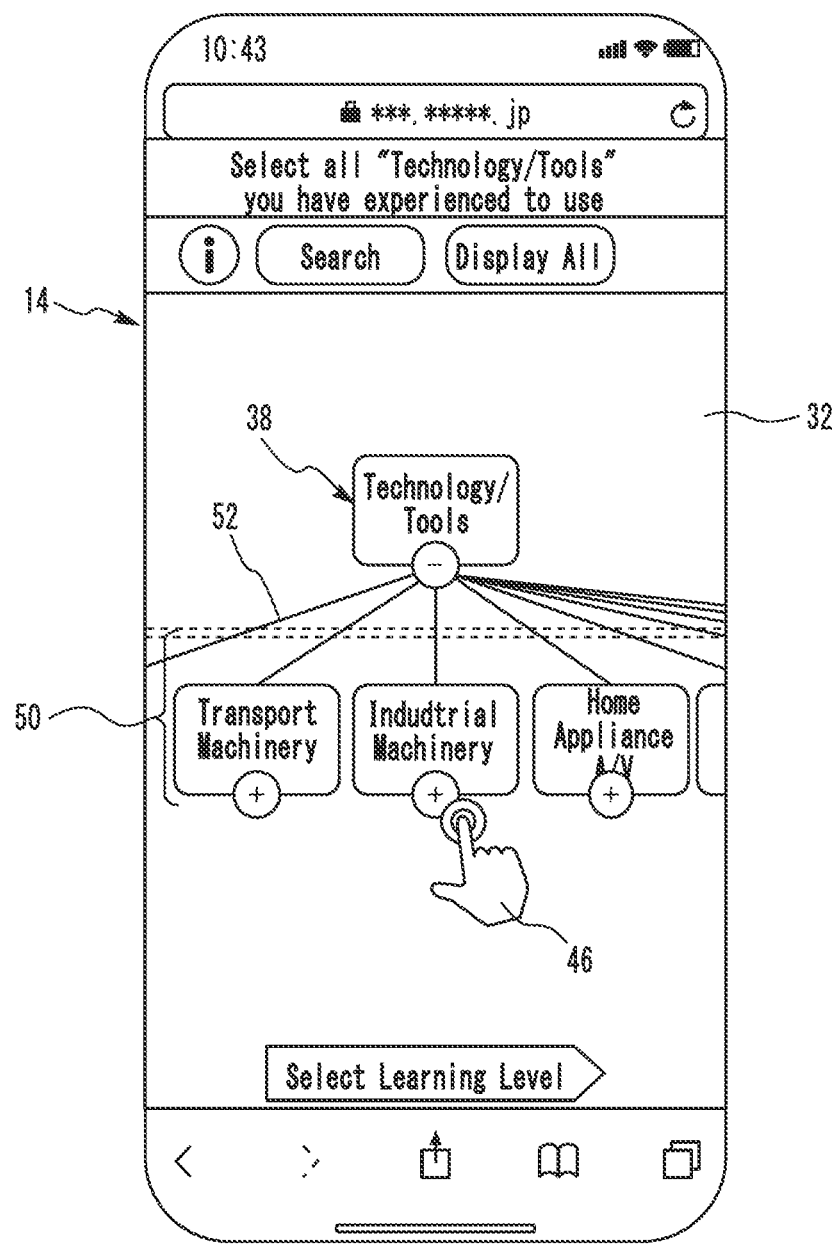
FIG. 6 shows a state obtained by sliding the child elements show in FIG. 5 in the width direction.

FIG. 6 shows a state in which all the elements lined up with the "Automobile Related" and "Industrial Machinery" elements 38, which are included in the width direction region 50, have slid together in the width direction, as a result of the width direction slide operation shown in FIG. 5. As a result, on the screen shown in FIG. 6, the "Industrial Machinery" element 38 is displayed in the vertical reference region.

A hand shape mark 46 shown in FIG. 6 indicates a user input for an expanding operation of tapping the expandable mark 42 of "Industrial Machinery". The "Industrial Machinery" element 38 is displayed in the vertical reference region. Therefore, when the expandable mark 42 thereof is tapped, all child elements subordinate to "Industrial Machinery" are expanded in the width direction region on a layer below the expandable. Note that, in FIG. 6, when the expandable mark 42 of an element 38 displayed at a position beyond the vertical reference region (for example, a "Home electric Appliances/AV" element 38) is tapped, the "Home electric Appliances/AV" element 38 may be automatically moved to the vertical reference region, and child elements subordinate to the element 38 may be expanded.

Figure 7:
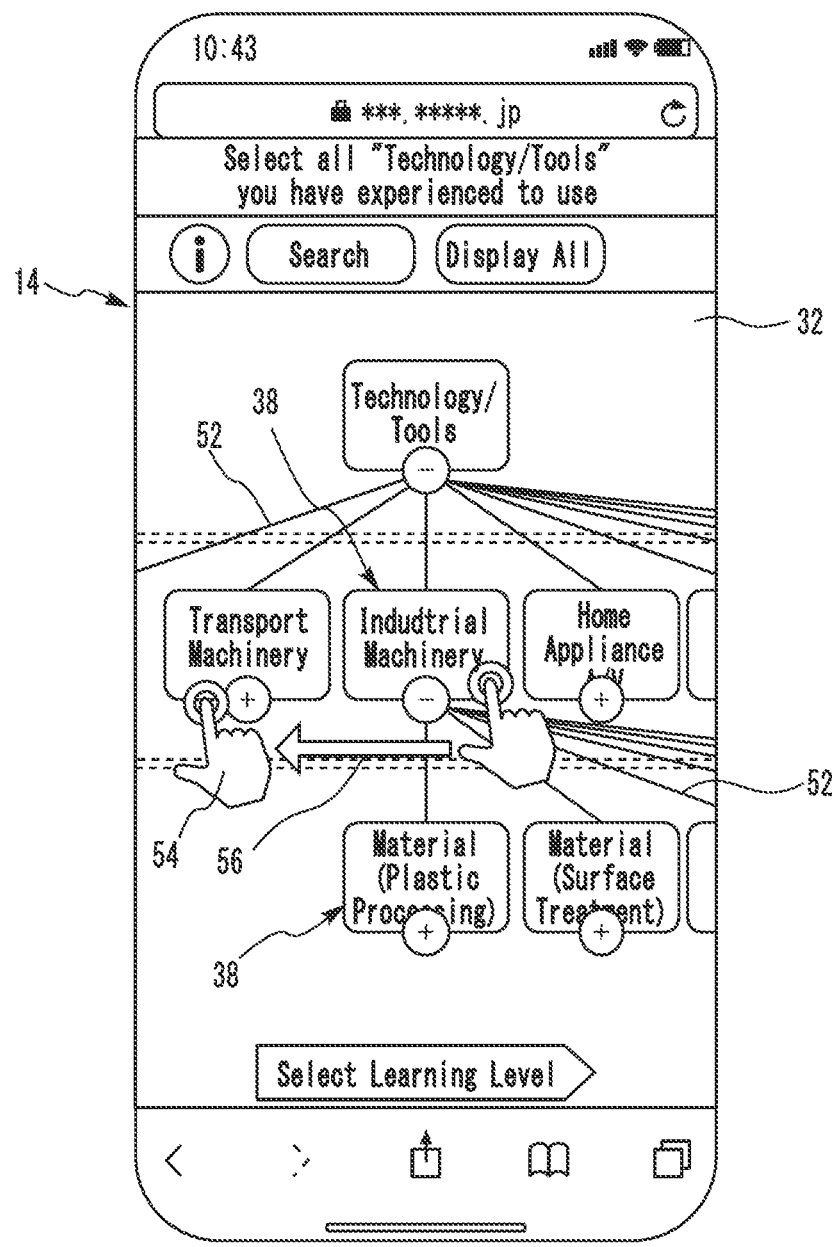
FIG. 7 shows a state in which the child elements of the "Industrial Machinery" located in the vertical reference region, i.e., the central region in the width direction, among the child elements shown in FIG. 6 are expanded.

FIG. 7 shows a state in which the child elements subordinate to the "Industrial Machinery" element 38 are expanded on a layer below the element 38, as a result of the expanding operation shown in FIG. 6. Further, two hand shape marks 54 and an arrow 56 between the two hand shape marks shown in FIG. 7 indicate a user input for a width direction slide operation performed, with the width direction region including the "Industrial Machinery" element 38 as a target. Thus, in the present embodiment, the width direction region including such an element 38 that child elements are expanded on a lower layer can also be targeted by a width direction slide operation.

Figure 8:
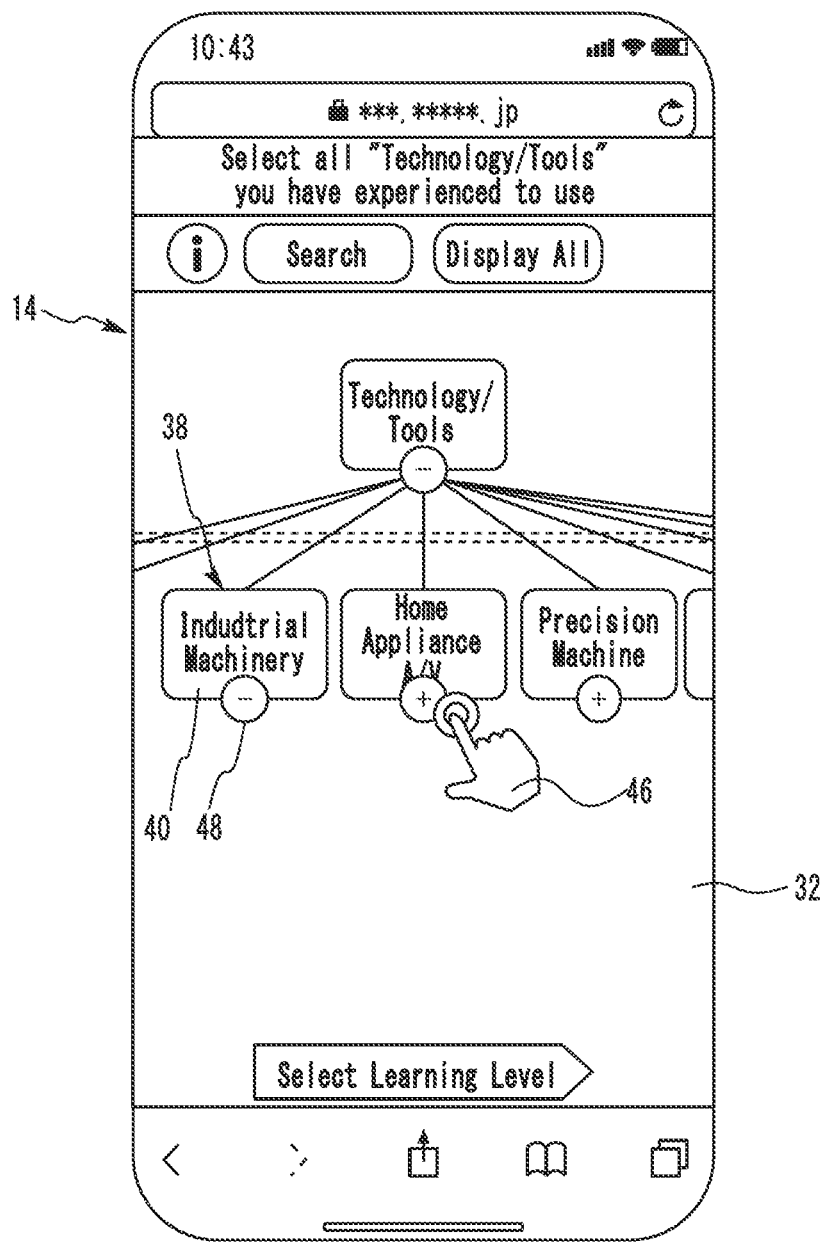
FIG. 8 shows a state in which the child elements of "Industrial Machinery" displayed in FIG. 7 are hidden because the element of "Industrial Machinery" has deviated from the vertical reference region by lateral slide.

FIG. 8 shows a state in which the "Industrial Machinery" element 38 has gone beyond the vertical reference region and moved to the left end of the display 32, as a result of the width direction slide operation shown in FIG. 7. Here, all the child elements expanded on the lower layer of "Industrial Machinery" are hidden. In other words, in the present embodiment, only when a parent element 38 is displayed in the vertical reference region, child elements expanded below the parent element 38 are displayed on the display 32. When the parent element 38 goes beyond the vertical reference region, the child elements subordinate to the element 38 are hidden even if the child elements have been already expanded.

It should be noted that, as shown in FIG. 8, even if the expanded child elements are hidden, the expanded mark 48 continues to be attached to the element 38 that had expanded once. Therefore, even if child elements that have been already expanded are hidden, the user can distinguish between an element 38 that had expanded once and an element 38 that have not expanded yet by seeing whether the expandable mark 42 is attached or the expanded mark 48 is attached.

A hand shape mark 46 shown in FIG. 8 indicates a user input for a expanding operation of tapping the expandable mark 42 of "Home electric Appliances/AV" newly displayed in the vertical reference region. Since the "Home electric Appliances/AV" element 38 is displayed in the vertical reference region, all child elements subordinate to "Home electric Appliances/AV" are expanded on a layer below the expandable mark 42 when the expandable mark 42 thereof is tapped.

Figure 9:
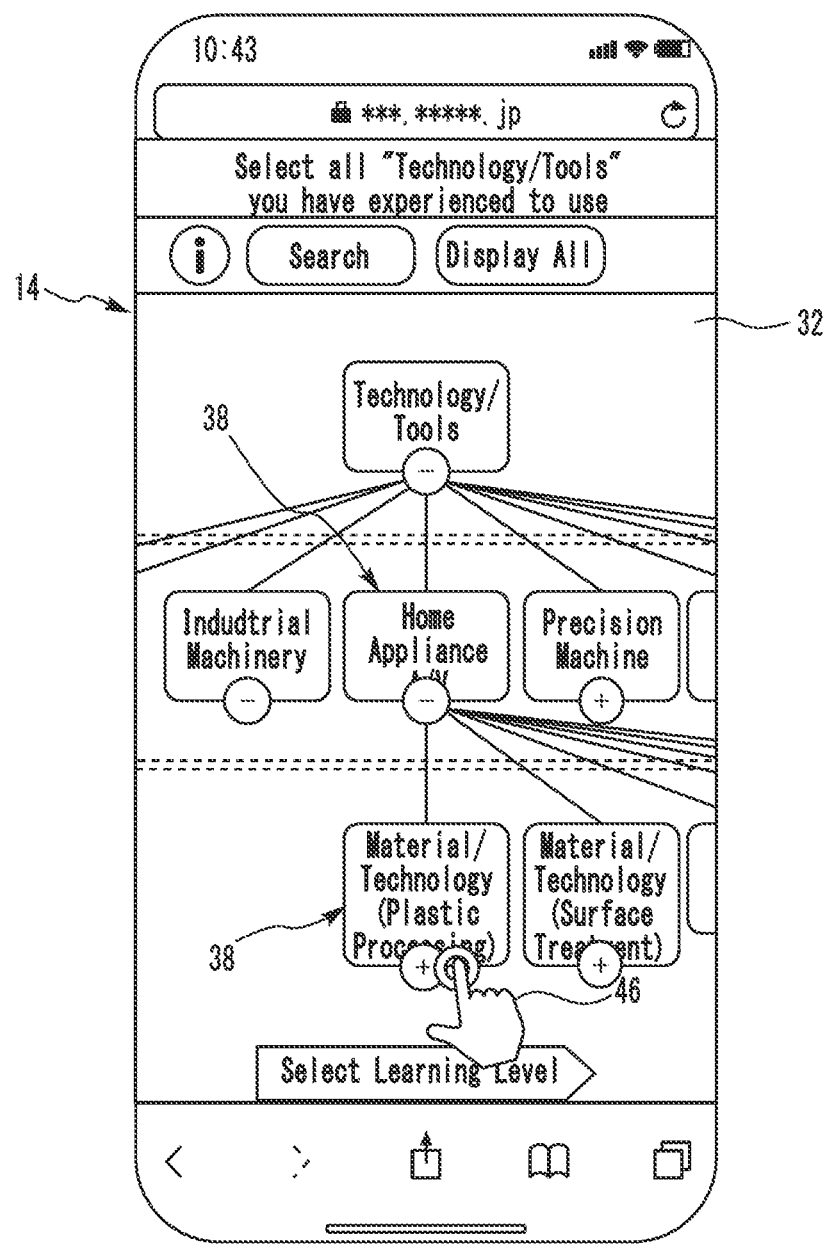
FIG. 9 shows a state in which child elements of "Home electric Appliances and AV" newly settled in the vertical reference region in FIG. 8 are expanded near the lower end of the display.

FIG. 9 shows a state in which the child elements subordinate to the "Home electric Appliances/AV" element 38 are expanded on the layer below the element 38, as a result of the expanding operation shown in FIG. 8. At a point of time when the screen shown in FIG. 9 is displayed, the user is interested in what child elements are subordinate to the "Home electric Appliances/AV" element 38. In other words, at this point of time, what child elements are subordinate to the "Industrial Machinery" element 38 is not the user's main interest any more. If, in such a situation, the child elements subordinate to "Industrial Machinery" are eliminated, and the child elements of "Home electric Appliances/AV" are displayed on the display 32, display noise decreases, and convenience for the user can be enhanced.

Further, according to the above rules, if child elements are expanded below a parent element, and grandchild elements are further expanded below the child elements, a child element to which a grandchild element is subordinate, and the parent element to which the child element is subordinate are in a relationship of being longitudinally arranged in the vertical reference region. In other words, in the present embodiment, an element to which an element displayed on the lowest layer is subordinate is displayed in the vertical reference region being longitudinally arranged. According to such display, the user can intuitively understand subordination relationship among displayed individual elements 38 across layers.

A hand shape mark 46 shown in FIG. 9 indicates a user input for a expanding operation of tapping the expandable mark 42 of "Material/Technology (Plastic Processing)" expanded in the vertical reference region near the lower end of the display 32. Since this element 38 is in the vertical reference region, child elements are expanded below the expandable mark 42 of the element 38 if the expandable mark 42 is tapped. However, since the "Material/Technology (Plastic Processing)" element 38 is expanded on the lower end of the display 32, the newly expanded child elements will go beyond the lower end of the display 32 in that state.

Figure 10:
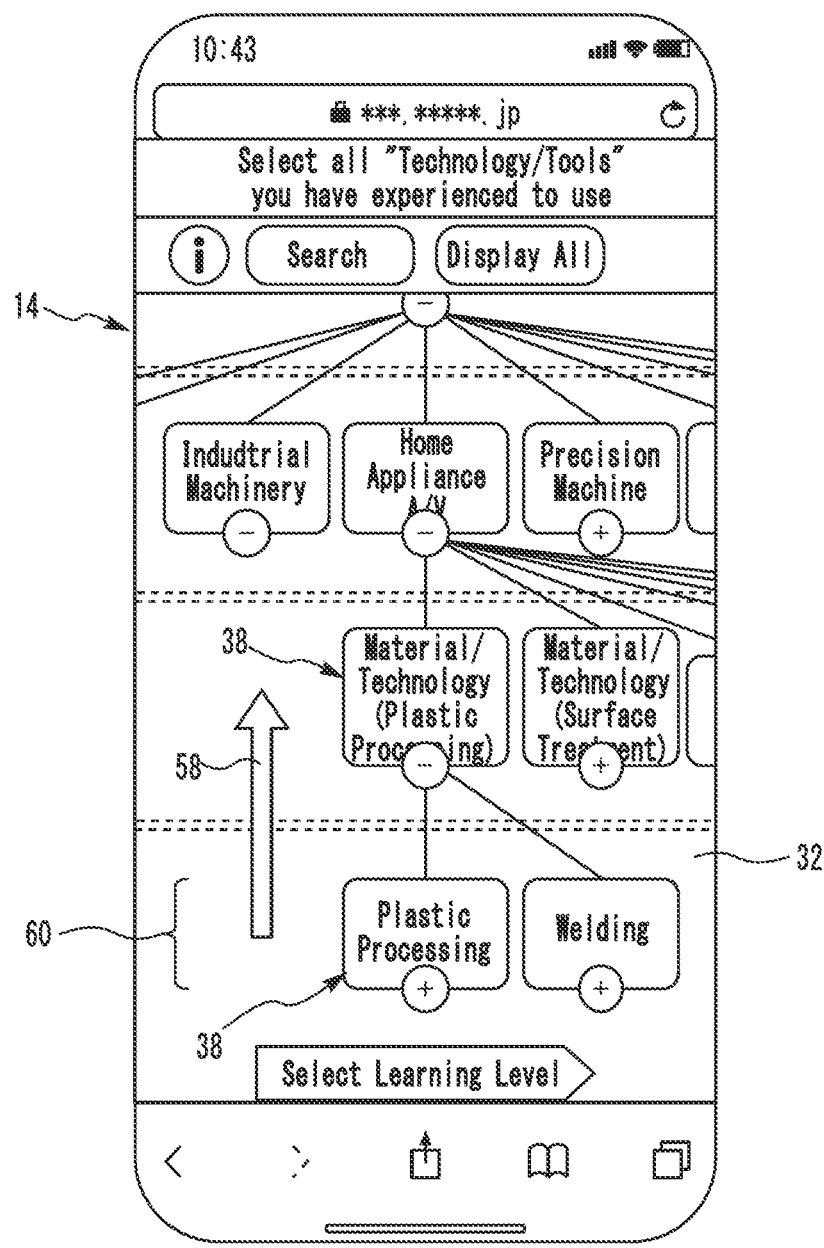
FIG. 10 shows a state in which child elements are newly expanded, and all the elements are vertically slid so that the newly expanded child elements are accommodated in the vertical direction of the display after an expansion operation is performed on the "Material/Technology (Plastic Processing)" located near the lower end of the display in FIG. 9.

FIG. 10 shows a screen displayed on the display 32 in response to the expanding operation shown in FIG. 9. In FIG. 10, an up arrow indicated by reference numeral 58 shows that all the elements 38 displayed on the display 32 have slid upward. Thus, in the present embodiment, if a width direction region 60 in which the child elements to be newly expanded should go beyond the display range of the display 32 in the longitudinal direction, all elements 38 that are displayed are automatically and longitudinally slid so that the width direction region 60 fits in the longitudinal direction of the display 32.

At a time point of requesting display of the screen shown in FIG. 10, the user is interested in what elements the child elements to be newly expanded are. The user is not interested so much in the element 38 on a higher layer that is displayed near the upper end of the display 32. If, in such a situation, all the displayed elements 38 are slid in the longitudinal direction so that newly expanded elements 38 of "Plastic Processing", "Welding" and the like are automatically fit in the display range, convenience for the user can be enhanced in comparison with a case where one operation is required to display the elements 38.

Note that, in the tree-information-providing device of the present embodiment, by giving a user input for a longitudinal direction slide operation to the display 32 of the terminal 14, all displayed elements 38 can be slid together in the longitudinal direction. Therefore, by sliding all the elements 38 downward by a longitudinal direction slide operation after the screen shown in FIG. 10 is generated, the user can call the element 38 which has been beyond the upper side of the display 32 onto the display 32 again.

As described above, according to the tree-information-providing device of the present embodiment, it is possible to preferentially provide information desired by the user onto the display 32 of the terminal 14 from the tree information that includes the pieces of information about many hierarchized elements. Since the size of each individual element 38 is maintained at a size suitable for visual confirmation, the user can efficiently access the whole of the tree information that includes the huge amount of information without performing enlargement/reduction of the screen.

Especially in the case of a terminal with a touch panel as an input interface, like a smartphone, it is common that an operation with two fingers is required for enlargement/reduction of a screen. According to the device of the present embodiment, such an operation with two fingers is not required, and the user can access the whole tree information only by an operation with one finger such as a tap operation and a slide operation. Therefore, according to this device, it is possible to provide excellent operability for users of smartphones and the like.

[Characteristics About Registration of Element]

Figure 11:
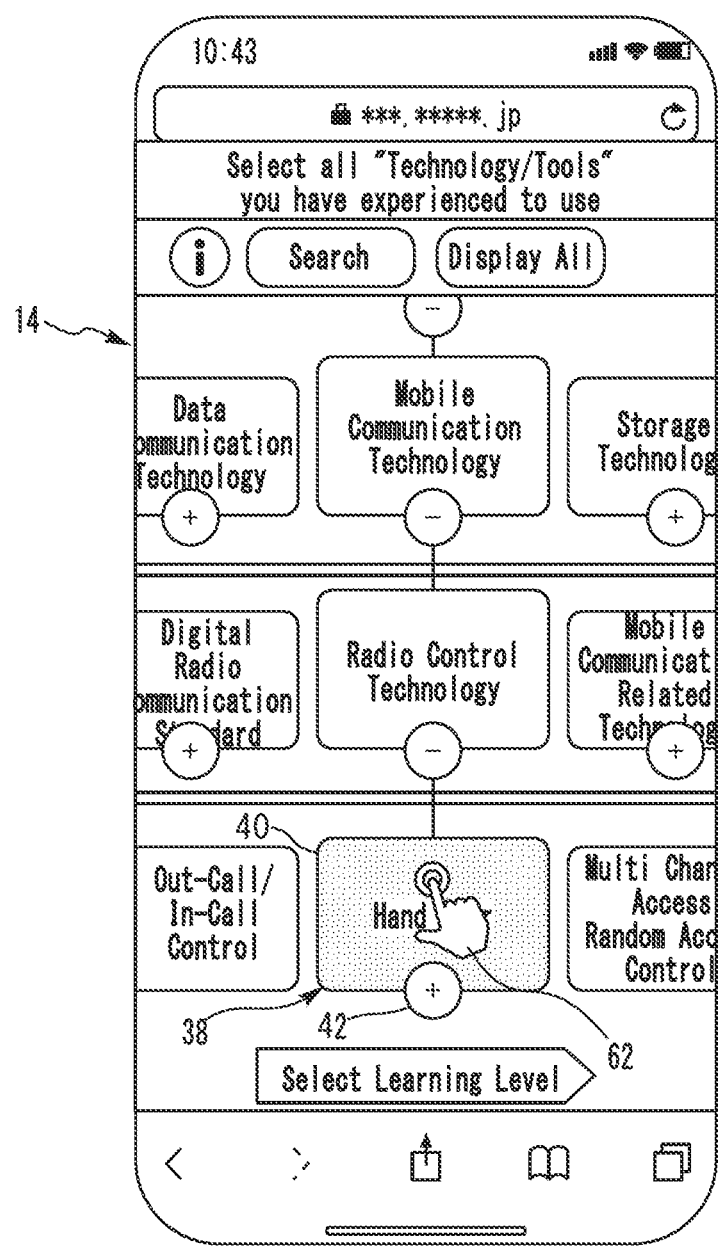
FIG. 11 is a diagram showing a state in which a designation operation is performed on an element of "Hand Over" located at the center of the lowest row.

Next, a description will be made on a process at the time of the user registering his technical skills with reference to FIGS. 11 to 16. FIG. 11 is a diagram for illustrating an operation performed when the user designates an element corresponding to his technical skills among elements 38 displayed on the terminal 14. Each individual element 38 is displayed being accompanied by the element mark 40 as described above. A hand shape mark 62 shown in FIG. 11 indicates a designation operation of tapping the element mark 40. Here, a "Hand Over" element 38 located on the lowest layer is designated by a tap.

As described with reference to FIG. 4 and the like, in the present embodiment, a tap on the expandable mark 42 attached to an element 38 is recognized as a expanding operation for causing child elements to be expanded. A tap on the element mark 40 is recognized as a designation operation of designating an element 38 itself as described above. Thus, in the present embodiment, a single operation of tapping realizes two kinds of instruction inputs by changing a tap target. Therefore, the user can easily perform both of expanding of an element 38 and designation of an element 38 without feeling annoyance of using different operations.

Figure 12:
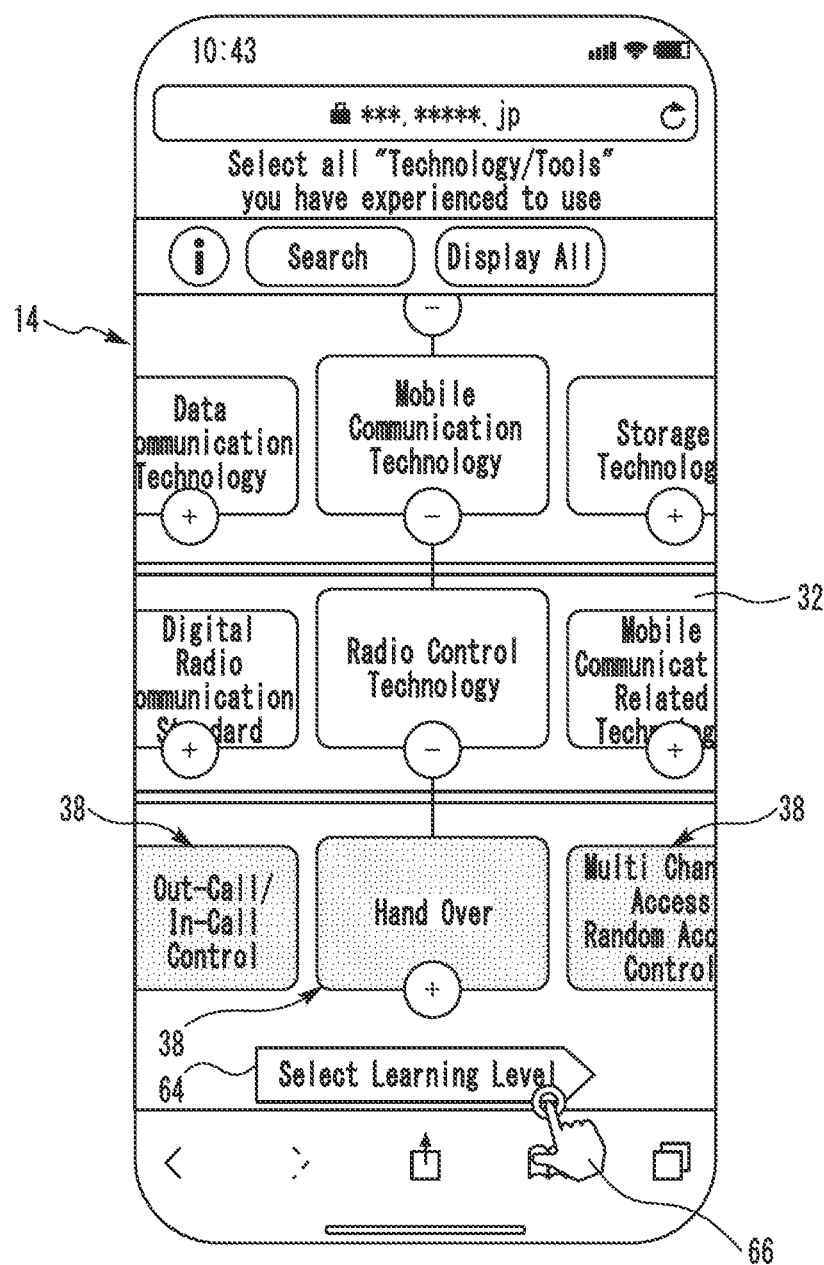
FIG. 12 shows a state in which designation operations are also performed on elements located on the left and right sides of the "Hand Over"

In the present embodiment, designation of all elements 38 to be registered is requested from the user at this stage. FIG. 12 shows a state in which "Out-Call/In-Call Control" and "Multi-Channel Access/Random Access Control" elements 38 located on the left and right of the "Hand Over" element 38 are designated, in addition to the "Hand Over" element 38. Further, a hand shape mark 66 shown in FIG. 12 indicates a user input for tapping a display 64 of "Select Learning Level" after finishing selection of all the elements 38.

Figure 13:
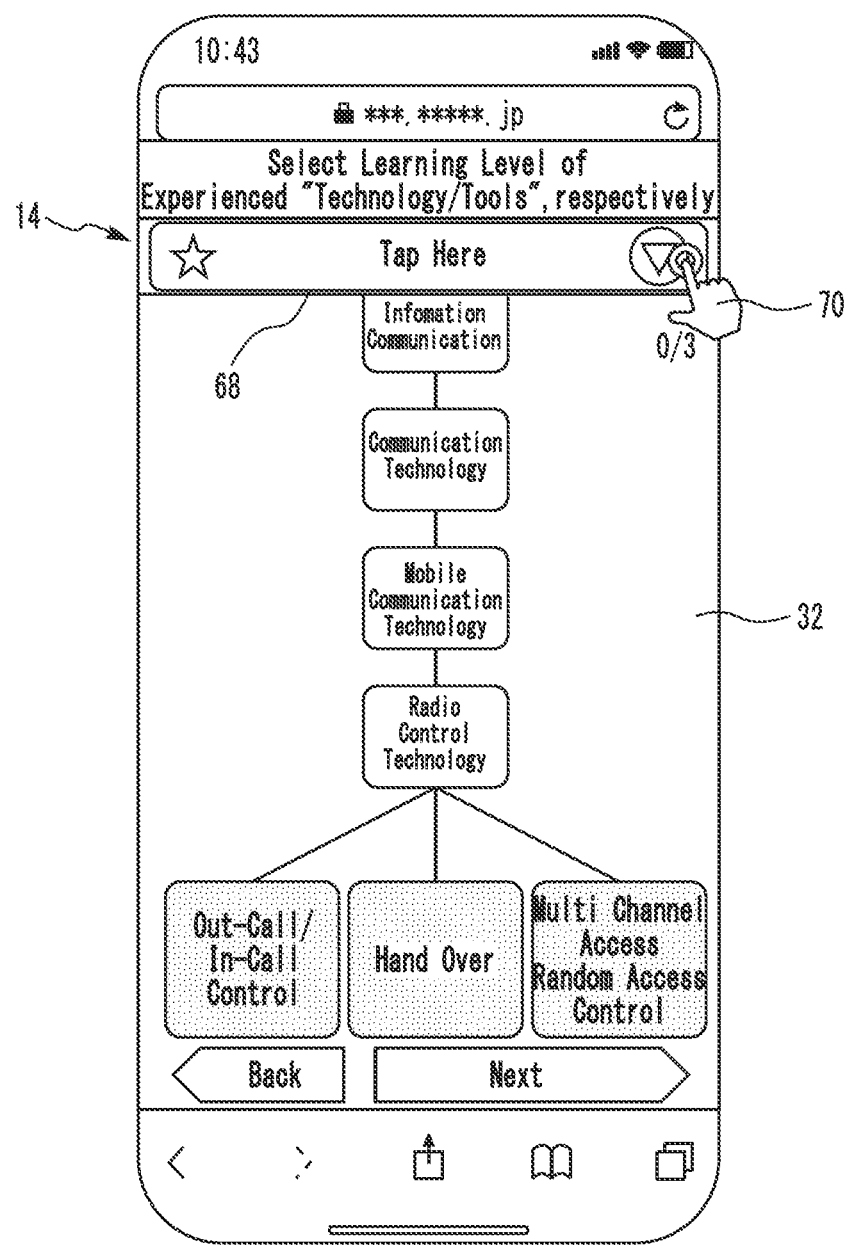
FIG. 13 shows a state in which a learning level input display is displayed in a reduced state on the display by tapping "Select Learning Level" shown in FIG. 12.

FIG. 13 shows a screen displayed on the display 32 in response to the tap operation shown in FIG. 12. Here, a reduced-version learning level input display 68 is shown. A hand shape mark 70 shown in FIG. 13 indicates a user input for enlarging the learning level input display 68.

Figure 14:
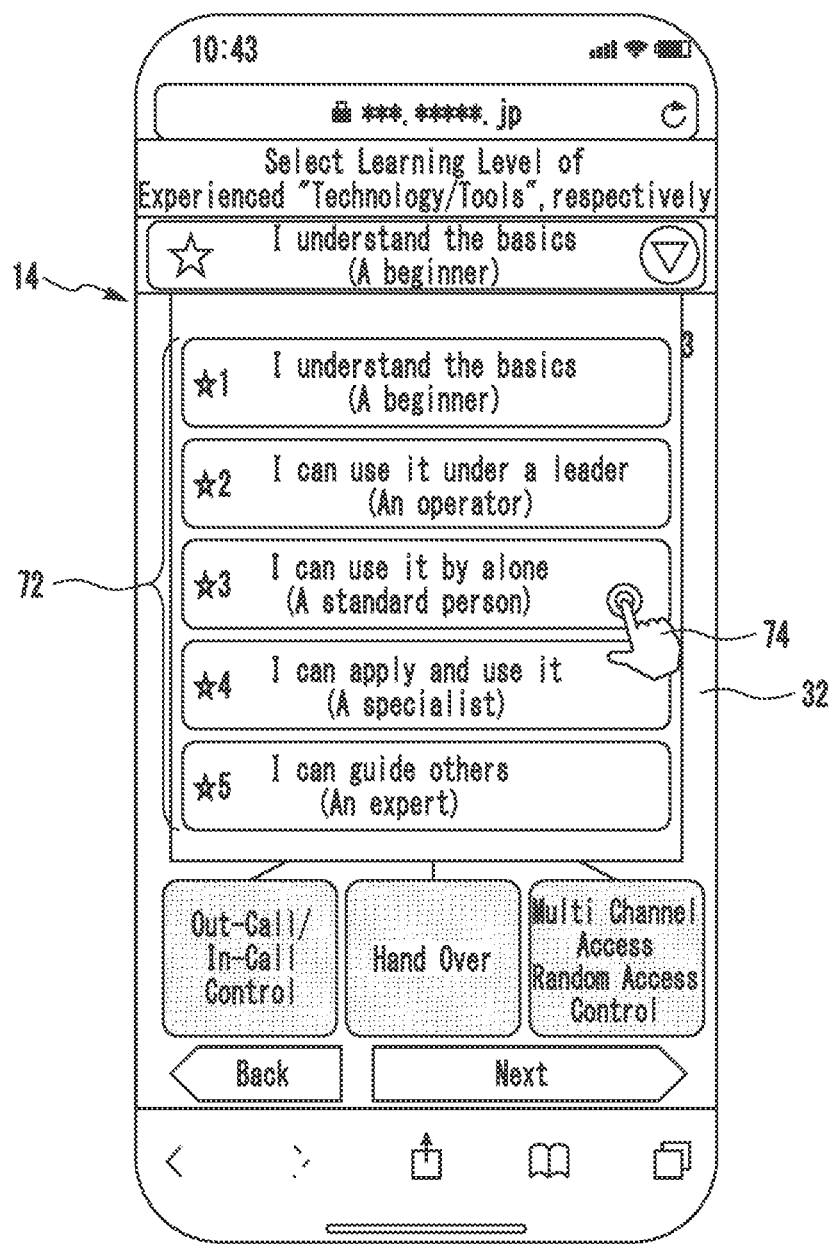
FIG. 14 shows a state in which Three-Stars are selected in an expanded learning level input display.

FIG. 14 shows a screen that includes an enlarged-version learning level input display 72. The learning level input display 72 includes displays of learning levels about technical skills, from One-Star to Five-Stars. A hand shape mark 74 shown in FIG. 14 indicates a user input for designating display of Three-Stars in the learning level input display 72.

Figure 15:
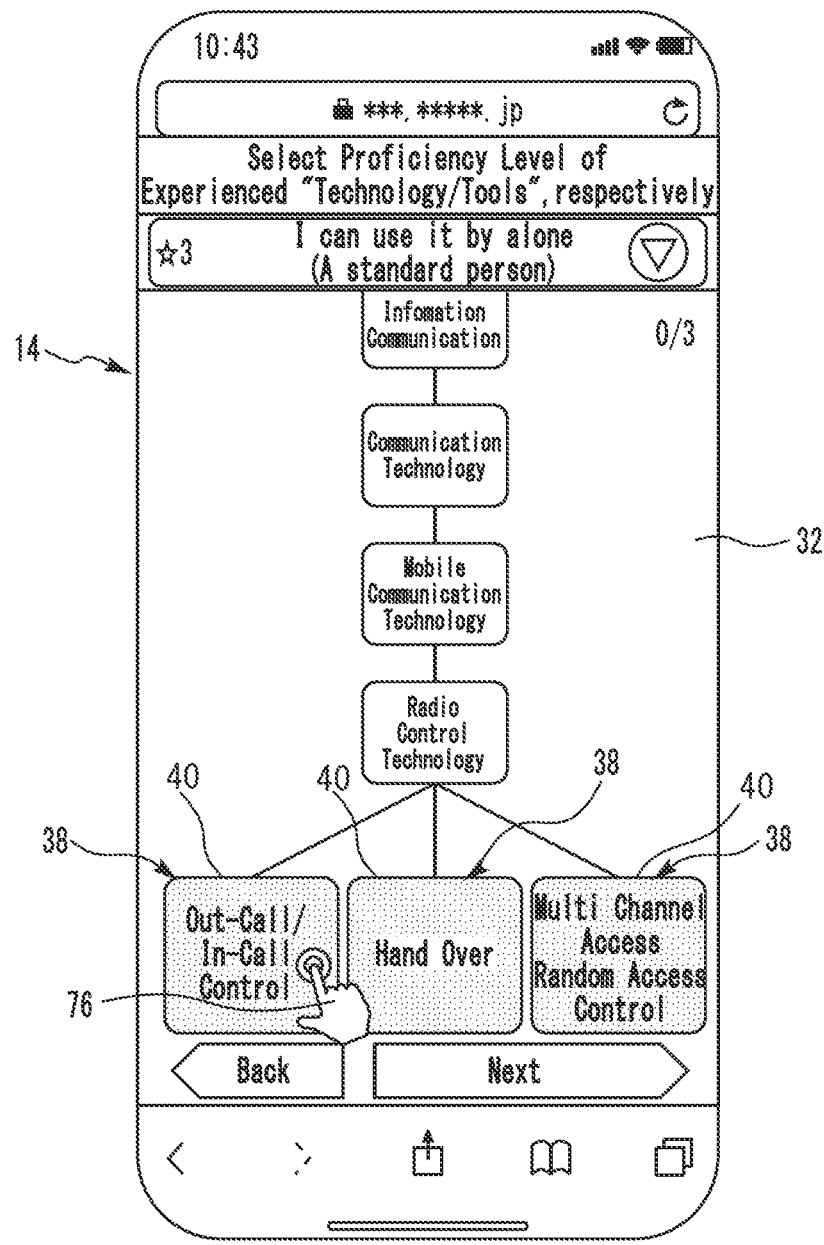
FIG. 15 shows a state in which an element of "Out-Call/In-Call Control" is designated in order to register Three-Stars as a learning level.

FIG. 15 shows a screen displayed on the display 32 in response to the designation operation shown in FIG. 14. In FIG. 15, near the upper end of the display 32, display of Three-Stars designated at this instance is shown. When the element mark 40 of a selected element 38 is tapped, the element 38 is registered with the learning level of Three-Stars. A hand shape mark 76 shown in FIG. 15 indicates a user input for registering the "Out-Call/In-Call Control" element 38 with the learning level of Three-Stars.

Figure 16:
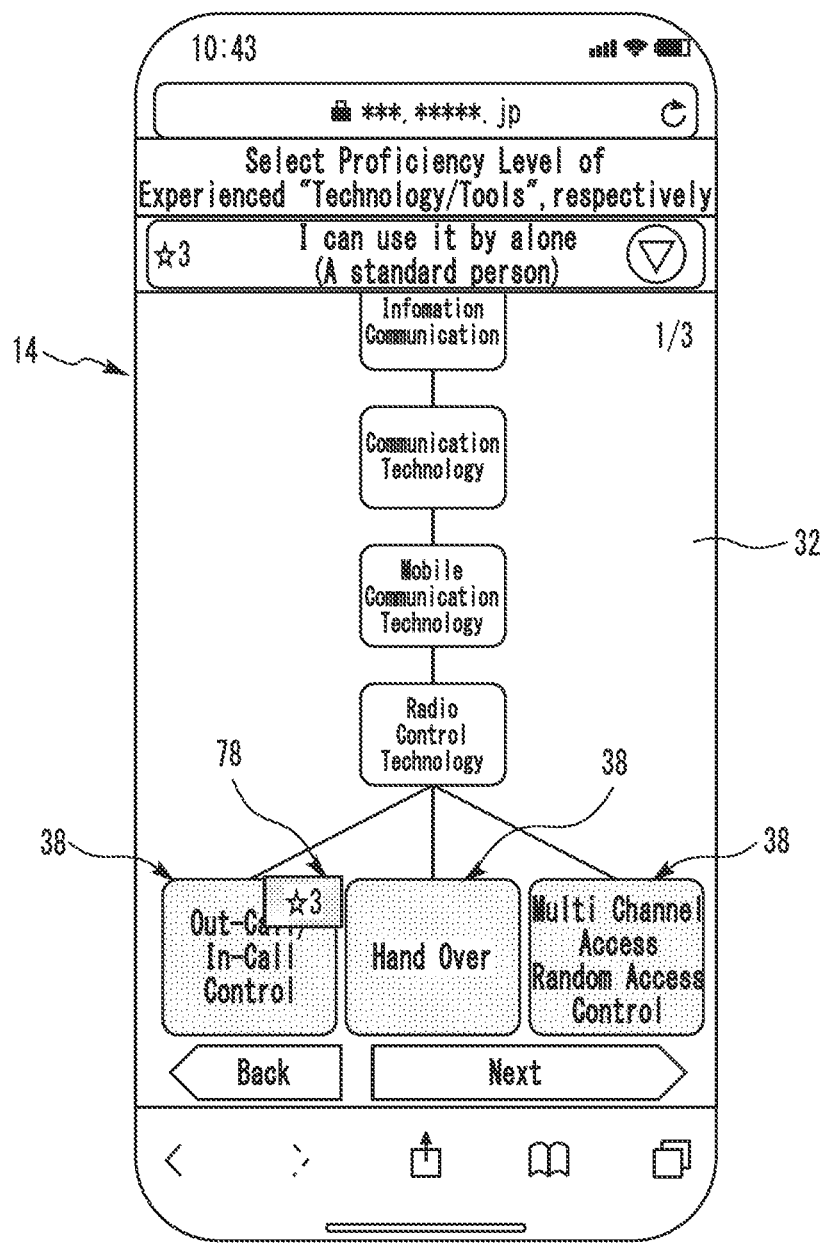
FIG. 16 shows a state in which Three-Stars are registered for the element of "Out-Call/In-Call Control" as a result of the designation operation shown in FIG. 15.

FIG. 16 shows a screen displayed on the display 32 in response to the above registration operation. In FIG. 16, a "Three-Stars" display 78 indicates that the "Out-Call/In-Call Control" element 38 has been registered with the learning level of Three-Stars. If there is another selected element 38 to be registered with the learning level of Three-Stars, the user is requested to tap the element 38. If desiring to register the selected element 38 with another learning level, the user opens the enlarged-version learning level input display 72 (FIG. 14) again and repeats the above process, starting from selection of a learning level. When the above process ends for all the selected elements 38, registration of technical skills by the user is completed.

The information registered in this way can be used by a recruiter in a process of selecting persons to be adopted, for example, as ability of technical skills that the user has.

Modification of First Embodiment

In the first embodiment described above, a tap operation and the like are described on the assumption that the terminal 14 having the form of a smartphone is used. If the terminal 14 is the terminal 15 in the form of a tablet or the terminal 16 in the form of a computer, changes corresponding to the terminal 15 or the terminal 16 are made. For example, the input interface is not limited to a touch panel, and a user input is not limited to a tap. A user input may be an operation using a mouse, a keyboard and the like as an input interface, or may be a voice instruction using a microphone as an input interface.

Further, in the embodiment described above, it is assumed that the management server 10 transmits a screen command to each of the terminals 14, 15 and 16, and each of the terminals 14, 15 and 16 displays a desired screen on the display 32. However, the present disclosure is not limited thereto.

For example, the program required to generate and display a desired screen may be stored in the terminals 14, 15 and 16, and only the tree information may be stored in the management server 10. In this case, the terminals 14, 15 and 16 may access the management server 10 to obtain the tree information or may acquire the tree information from the management server 10 by download. Furthermore, the tree-information-providing device of the present embodiment may be realized in a standalone form on a single computer or the like without using a network.

Further, though, in the first embodiment described above, the expandable mark 42 is used to indicate that child elements are subordinate on a layer below an element 38, and the expanded mark 48 is used to indicate that child elements have been expanded, the present disclosure is not limited thereto. For example, instead of the marks, whether expanding is possible or not and whether expanding has been already performed or not may be indicated by colors, shapes, sizes or the like.

Further, although the central area of the display 32 in the width direction is the vertical reference region 44 in the above embodiment, the present disclosure is not limited thereto. The vertical reference region 44 is only required to be defined at a predetermined position in the width direction of the display 32, and the position is not limited to the center in the width direction.

Further, although in the first embodiment described above, the tree information is assumed to be information about technical skills, and, as an example thereof, hierarchized pieces of information with "Technology/Tools" being located on the highest layer are shown, the present disclosure is not limited thereto. As the tree information, anything can be used for the present disclosure if pieces of information about many hierarchized elements are included. Further, the tree information about technical skills may be such that is hierarchized with any of "Occupational Categories/Processes", "Products/Parts" and "Learning (subjects)" as an element on the highest layer, in addition to the tree information with "Technology/Tools" as the element on the highest layer.

Further, although a learning level is associated with an element 38 related to the user's technical skills in the first embodiment described above, information associated with the element 38 is not limited thereto. For example, with each of elements 38 selected by the user, a degree of importance of the element, a favorite level of the element, or the like may be associated.

Note that, in the first embodiment described above, the display 32 of the terminal 14 corresponds to the "input interface" and the "display" in the first aspect of the disclosure; the CPU 18 of the management server 10 corresponds to the "control unit" in the first aspect of the disclosure; and the storage 26 of the management server 10 corresponds to the "memory" in the first aspect of the disclosure.

Further, in the embodiment in which the program required to generate and display a desired screen is stored in the terminals 14, 15 and 16, the display 32 of the terminals 14 and 15 and the keyboard and the mouse of the terminal 16 correspond to the "input interface" in the second aspect of the disclosure; the display 32 of the terminal 14, 15 or 16 corresponds to the "display" in the second aspect of the disclosure; the CPU 18 of the terminal 14, 15 or 16 corresponds to the "control unit" in the second aspect of the disclosure; and the storage 26 of the management server 10 corresponds to the "memory" in the second aspect of the disclosure.

Further, in the first embodiment described above, the expandable mark 42 corresponds to the "expandable indication" in the present disclosure; and the expanded mark 48 corresponds to the "expanded mark" in the present disclosure.

DESCRIPTION OF REFERENCE NUMERALS 10 management server
14 terminal (smart phone)
15 terminal (tablet)
16 terminal (computer)
18 CPU
30 input interface
32 display
40 element mark
42 expandable mark
44 vertical reference region
48 expanded mark
50, 60 width direction region
52 line

The invention claimed is:

1. A tree-information-providing device comprising:
a memory; and
a controller configured to accept a user input from an input interface, access the memory configured to store tree information that includes pieces of information about many hierarchized elements, and generate a screen command related to a display screen of a display, wherein
the controller is configured to execute:
causing the elements included in the tree information to be displayed on the display, in response to a user input for display of the elements;
accepting a user input for an expanding operation for any of the elements displayed on the display;
in response to the expanding operation, displaying the element targeted by the expanding operation in a vertical reference region extending in a longitudinal direction, the vertical reference region being defined at a particular position in a width direction of the display;
expanding child elements in a width direction region extending in the width direction one layer below the element on the display, if the element displayed in the vertical reference region has received the expanding operation, and one or more child elements are subordinate to the element on a layer lower than the element in the tree information;
accepting a user input for a width direction slide operation;
causing all the elements included in the width direction region, which are targeted by the width direction slide operation, to laterally slide together in the width direction, in response to the width direction slide operation; and
causing child elements subordinate to an element that has gone beyond the vertical reference region in the width direction to be hidden on the display.

2. The tree-information-providing device according to claim 1, wherein the controller is configured to further execute maintaining a size of each of the elements displayed on the display at a fixed size and displaying elements within a range that fits in a display area of the display, among all the elements requested to be displayed, on the display.

3. The tree-information-providing device according to claim 2, wherein
the controller is configured to further execute:
accepting a user input for a longitudinal direction slide operation; and
causing all the elements requested to be displayed on the display to longitudinally slide together in the longitudinal direction, in response to the longitudinal direction slide operation.

4. The tree-information-providing device according to claim 2, wherein the controller is configured to further execute causing all the elements requested to be displayed on the display to longitudinally slide together in the longitudinal direction so that the width direction region fits in the longitudinal direction, if the width direction region where the child elements newly expanded in response to the expanding operation are to be displayed goes beyond the display area of the display in the longitudinal direction.

5. The tree-information-providing device according to claim 1, wherein the controller is configured to further execute, in the case of displaying on the display an element comprising the child elements on a lower layer, the child elements being unexpanded, attaching an expandable indication indicating that expanding is possible to the element.

6. The tree-information-providing device according to claim 5, wherein the controller is configured to further execute changing the expandable indication to an expanded indication, when accepting the user input for the expanding operation for the element attached with the expandable indication.

7. The tree-information-providing device according to claim 5, wherein
the expandable indication is an expandable mark added to a display of the element; and
the controller is configured to further execute:
accepting a user input targeting the expandable mark as the expanding operation; and
accepting a user input targeting the display of the element as a designation operation of the element.

8. The tree-information-providing device according to claim 7, wherein
the elements included in the tree information are about hierarchized technical skill items; and
the controller is configured to further execute:
accepting a user input of a learning level for the element targeted by the designation operation, when accepting the designation operation; and
registering the learning level in association with the element.

9. The tree-information-providing device according to claim 1, wherein the controller is configured to further execute displaying a line connecting each of the child element and an element to which the child element is subordinate on the display together, when displaying the child elements on the display.

10. A non-transitory computer readable medium having thereon instructions for tree information provision that a controller is caused to execute, the controller being configured to accept a user input from an input interface, access a memory storing tree information that includes pieces of information about a plurality of hierarchized elements, and generate a screen command related to a display screen of a display, wherein the instructions, when executed on a computer, perform a method for causing the controller to realize:
causing the elements included in the tree information to be displayed on the display, in response to a user input for display of the elements;
accepting a user input for an expanding operation for any of the elements displayed on the display;
in response to the expanding operation, displaying the element targeted by the expanding operation in a vertical reference region extending in a longitudinal direction, the vertical reference region being defined at a particular position in a width direction of the display;
if the element displayed in the vertical reference region has received the expanding operation, and one or more child elements are subordinate to the element on a layer lower than the element in the tree information, expanding and displaying the child elements in a width direction region extending in the width direction one layer below the element on the display;
accepting a user input for a width direction slide operation;
causing all the elements included in the width direction region, which are targeted by the width direction slide operation, to laterally slide together in the width direction, in response to the width direction slide operation; and
causing child elements subordinate to an element that has gone beyond the vertical reference region in the width direction to be hidden on the display.

11. The non-transitory computer readable medium according to claim 10, further comprising an instruction, when executed on a computer, perform a method for causing the controller to realize maintaining a size of each of the elements displayed on the display at a fixed size and displaying elements within a range that fits in a display area of the display, among all the elements requested to be displayed, on the display.

12. The non-transitory computer readable medium according to claim 11, further comprising an instruction, when executed on a computer, perform a method for causing the controller to realize:
accepting a user input for a longitudinal direction slide operation; and
causing all the elements requested to be displayed on the display to longitudinally slide together in the longitudinal direction, in response to the longitudinal direction slide operation.

13. The non-transitory computer readable medium according to claim 11, further comprising an instruction, when executed on a computer, perform a method for causing the controller to realize, if the width direction region where the child elements newly expanded in response to the expanding operation are to be displayed goes beyond the display area of the display in the longitudinal direction, causing all the elements requested to be displayed on the display to longitudinally slide together in the longitudinal direction so that the width direction region fits in the longitudinal direction.

14. The non-transitory computer readable medium according to claim 10, further comprising an instruction, when executed on a computer, perform a method for causing the controller to realize, in the case of displaying on the display an element comprising the child elements on a lower layer, the child elements being unexpanded, attaching a expandable indication indicating that expanding is possible to the element.

15. The non-transitory computer readable medium according to claim 14, further comprising an instruction, when executed on a computer, perform a method for causing the controller to realize changing the expandable indication to an expanded indication, when accepting the user input for the expanding operation for the element attached with the expandable indication.

16. The non-transitory computer readable medium according to claim 14, wherein
the expandable indication is an expandable mark added to a display of the element; and
the non-transitory computer readable medium further comprises an instruction, when executed on a computer, perform a method for causing the controller to execute:
causing a user input targeting the expandable mark to be accepted as the expanding operation; and
causing a user input targeting the display of the element to be accepted as a designation operation of the element.

17. The non-transitory computer readable medium according to claim 16, wherein
the elements included in the tree information are about hierarchized technical skill items; and
the non-transitory computer readable medium further comprises an instruction, when executed on a computer, perform a method for causing the controller to realize:
causing a user input of a learning level to be accepted for the element targeted by the designation operation, after accepting the designation operation; and
registering the learning level in association with the element.

18. The non-transitory computer readable medium according to claim 10, further comprising an instruction, when executed on a computer, perform a method for causing the controller to realize displaying a line connecting each of the child element and an element to which the child element is subordinate on the display together, when displaying the child elements on the display.

* * * * *